Patented Oct. 13, 1953

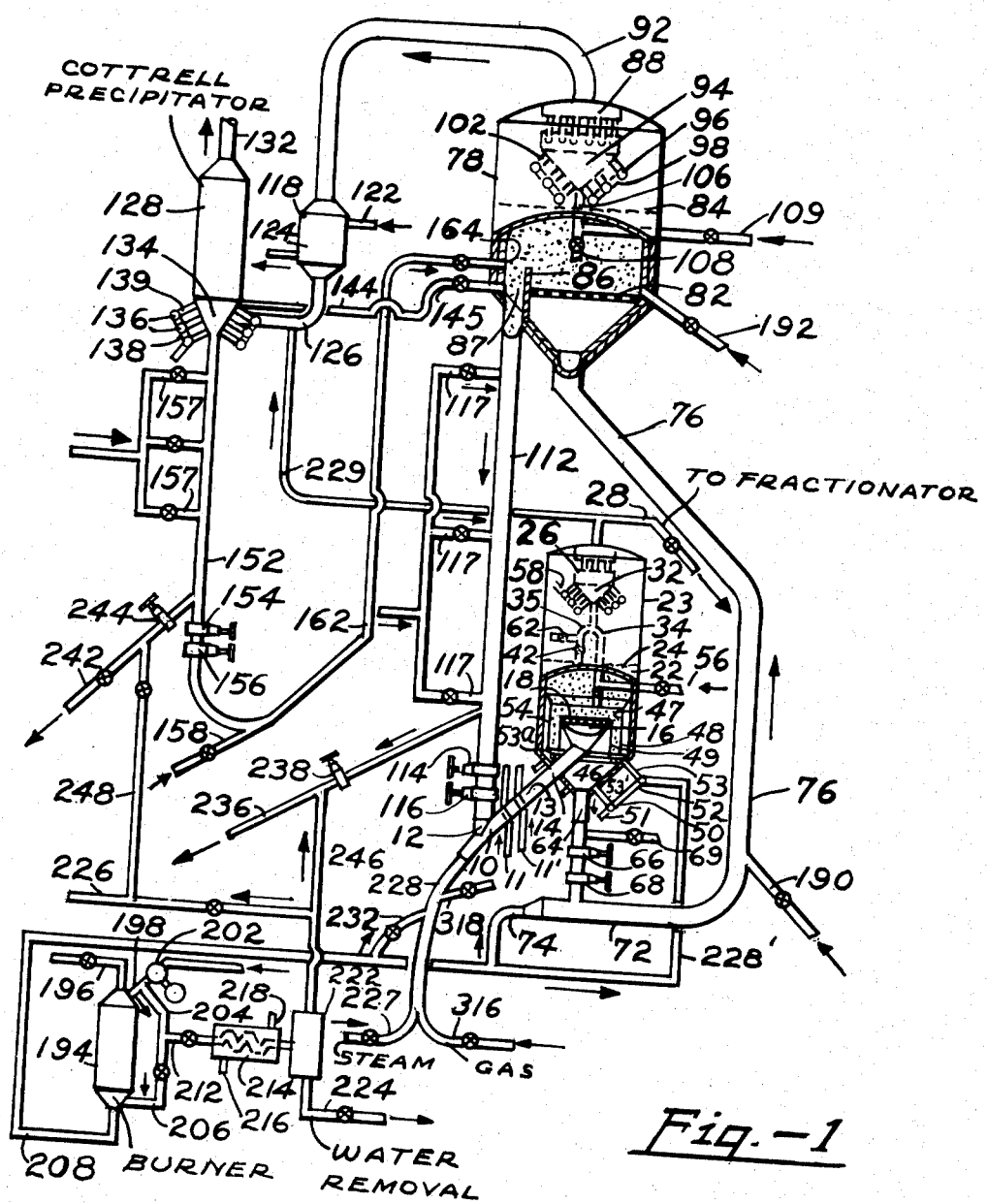

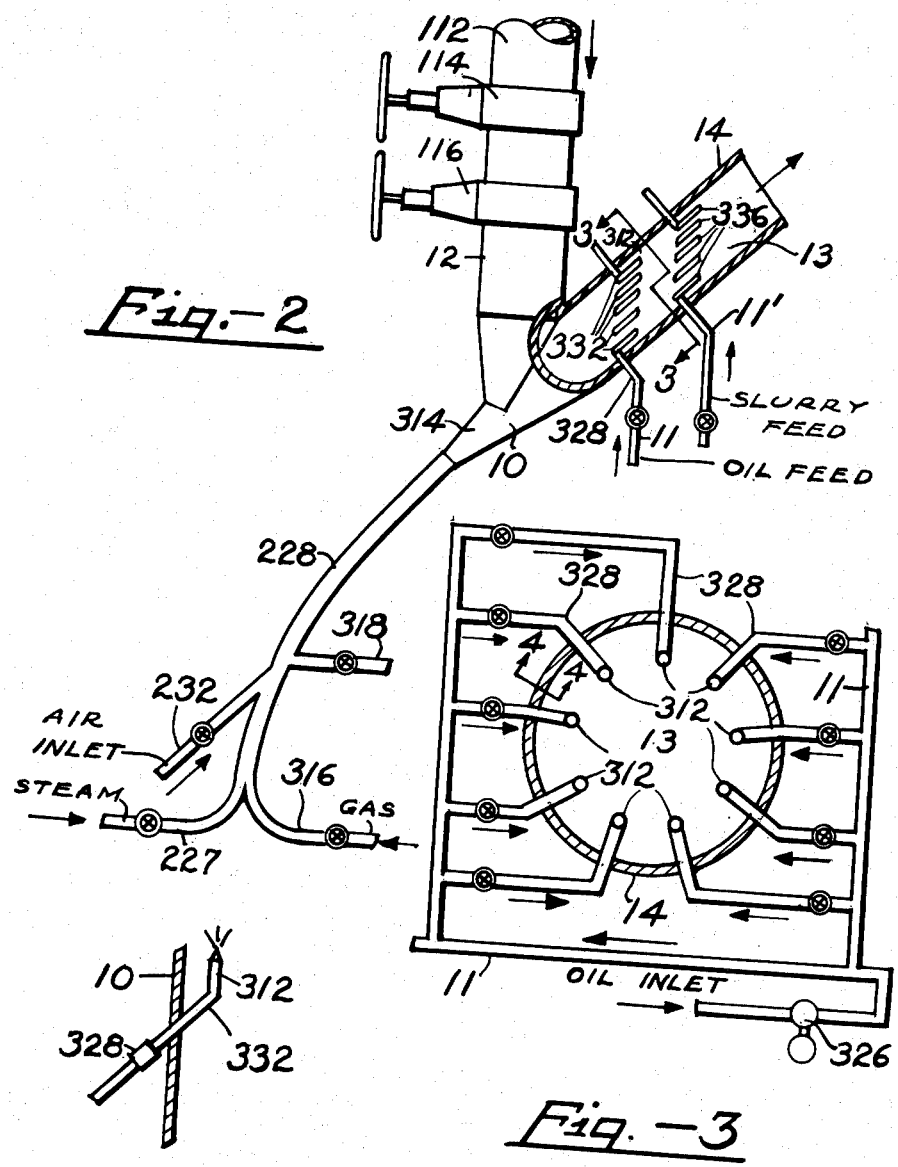

2,655,466

UNITED STATES PATENT OFFICE 2,655,466

PROCESS FOR SHUTTING-DOWN CATALYTIC APPARATUS EMPLOYED FOR THE CONVERSION OF HYDROCARBONS

Edwin J. Gohr, New York, N. Y., and Homer Z. Martin, Cranford, Charles E. Jahnig, Red Bank, Charles W. Tyson, Summit, and John M. Graham, Plainfield, N. J., assignors to Standard Oil Development Company, a corporation of Delaware Original application December 30, 1942, Serial No. 470,534. Divided and this application October 6, 1949, Serial No. 119,912

1 Claim. (Cl. 196—52)

This invention relates to catalytic reactions in which the catalyst is in powdered or finely divided form and more particularly relates to the catalytic treatment or conversion of hydrocarbons.

According to this invention the reactants and powdered catalyst are maintained in a reaction zone which forms part of a larger vessel and the velocity of the vapor or gaseous reactants passing through the reaction zone is so selected that the powdered catalyst or contacting agent is maintained in a fluidized condition in the reaction zone and assumes some of the characteristics of a liquid. The fluidized catalyst particles have a level located below the top of the reaction zone. Vaporous reaction products pass overhead and spent dry catalyst is removed from the bottom of the reaction zone in a dense fluidized condition. Before being removed from the vessel forming the reaction zone, the spent catalyst is purged to remove volatile constituents from the catalyst particles.

The powdered catalyst is introduced into the bottom portion of the reaction zone and in the preferred form of the invention the solid contact or catalyst particles are at a relatively high temperature and are mixed with preheated liquid or liquid and vapor reactants to supply the heat necessary to substantially completely vaporize the reactants and to supply the heat of reaction. Means are provided for thoroughly mixing the liquid reactants and the powdered catalyst. The discharge end of the pipe or tube for introducing the catalyst into the reaction zone is arranged above the bottom of the vessel of which a part forms the reaction zone and preferably has a flared or cone shaped end. Adjacent the discharge end of the inlet pipe the wall of the reaction zone may be constricted so that the velocity of the stripping gas passing from the stripping zone to the reaction zone does not fall below a minimum. An annular stripping zone is provided in the vessel below the flared or cone shaped outlet.

Where the level of fluidized catalyst in the reaction zone is located some distance from the vapor outlet end of the reaction zone and the velocity of the vaporous reaction products leaving the reaction zone is relatively low, only a small amount of catalyst particles is carried overhead with the reaction products. A cyclone separating means or other separating means is provided in the top of the reaction zone to remove most of the entrained catalyst particles passing overhead with the vaporous reaction products. The separating means is provided with a plurality of dip or return pipes of different lengths to return the catalyst particles to the reaction zone when operating with different levels of catalyst in the reaction zone. The separated reaction products in vapor form are then passed to suitable equipment for the separation of desired fractions.

In certain reactions the catalyst particles become inactivated or spent and it is necessary to regenerate them before using them again in another catalytic operation. As above pointed out, the catalyst particles in the reaction zone are maintained in a relatively dense fluidized condition and flow into the stripping zone from which they are withdrawn and passed to a regeneration zone. The withdrawn catalyst particles are mixed with a regenerating gas such as oxygen or air or other oxygen-containing gas and the mixture passed through the regeneration zone. During regeneration the velocity of the gases is so selected to give a fluidized bed of catalyst. The hot regenerated catalyst is withdrawn from the bottom of the regeneration zone and is introduced into a standpipe by means of which it is returned to the reaction zone. The level of the catalyst particles undergoing regeneration is maintained at a certain distance from the top of the regeneration zone so that only a small amount of catalyst particles is entrained with the regeneration gases passing overhead.

The regeneration gases are passed through a separating means for separating solid particles from gases. The separating means is arranged in the upper part of the regeneration zone. One or more dip or return pipes are provided for returning the separated catalyst particles to the catalyst bed undergoing regeneration.

The regeneration gases leaving the separating means still contain a small amount of powdered catalyst or contact particles and the regeneration gases are introduced into an electrical precipitator or other separator to remove substantially all of the entrained catalyst particles from the regeneration gas. The catalyst particles recovered in the electrical precipitator are difficult to fluidize and preferably coarser regenerated catalyst from the regeneration zone is introduced into the hopper below the precipitator to make a coarser mixture which can be fluidized. The last mentioned mixture is introduced into the top of a standpipe and then returned to the regeneration zone with a conveying gas.

In some cases insufficient heat is obtained on regeneration to heat the contact particles to the desired temperature and in such case heat is supplied to the regeneration zone by an auxiliary burner or oil may be injected into the regeneration zone.

In the drawings:

Fig. 1 represents one form of the invention which embodies the principles of the invention;

Fig. 2 represents a detail partly in section showing the mixing chamber for mixing the contacting agent and reactants;

Fig. 3 represents a vertical cross section taken substantially on line 3—3 of Fig. 2, and Fig. 4 represents a sectional view taken substanially on line 4—4 of Fig. 3 and showing nozzles for introducing the liquid feed into the powdered catalyst or contact particles.

Figure 1A:
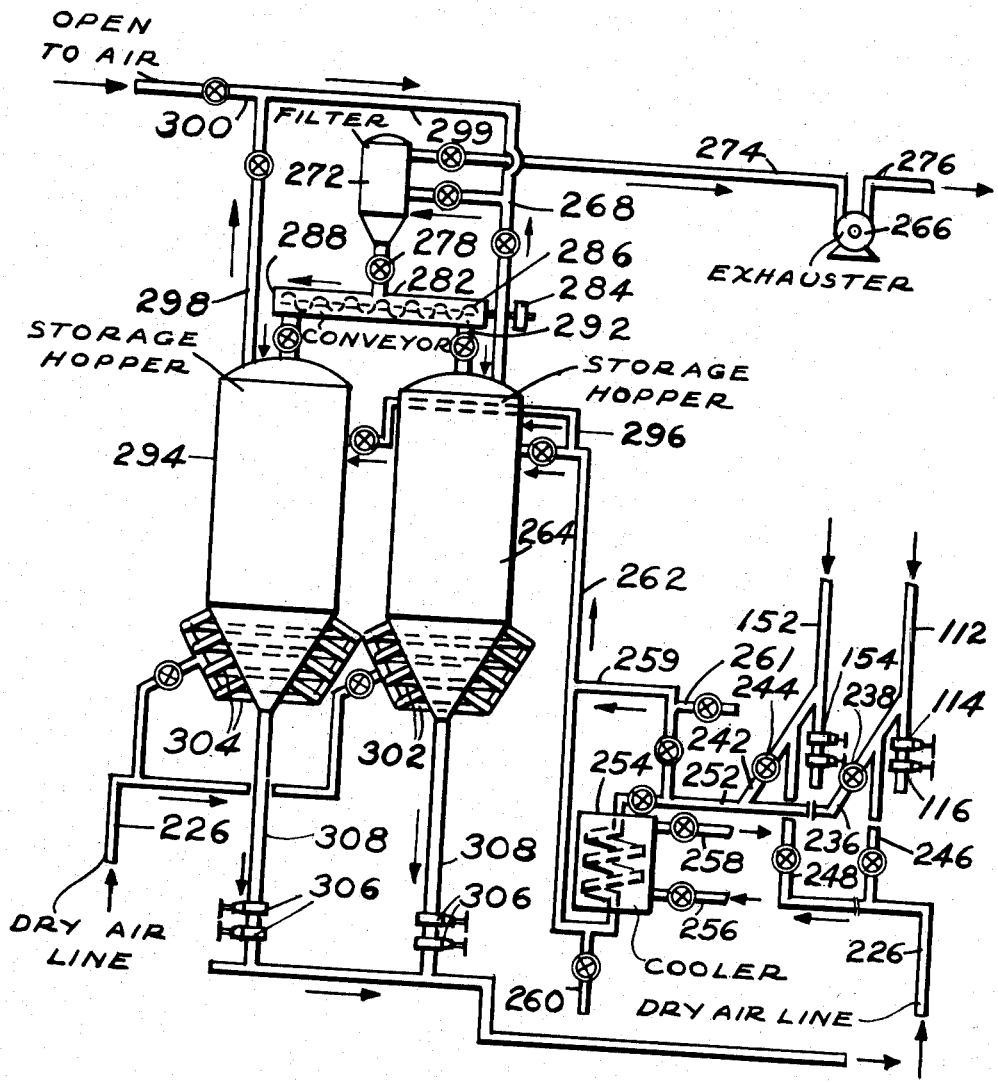
Fig. 1A represents a continuation of Fig. 1 and includes storage hoppers and associated parts for receiving catalyst or contact particles from the reaction vessels shown in Fig. 1 when the unit is to be shut down.

Referring now to the drawings and to Fig. 1, the reference character 10 designates a line or pipe into which reactants are introduced through lines 11 and 11' and catalytic material through line 12 as will be later described. The mixing of the liquid reactants and powdered material will be hereinafter described in greater detail. In certain reactions the reactants may be introduced at ordinary temperatures and the heat necessary for preheating the reactants and for the reaction is supplied by hot regenerated catalyst or contact particles. In the catalytic cracking of hydrocarbons or other conversion operation the oil feed may be partly preheated by passing through heat exchangers but insufficient heat is supplied to completely vaporize the oil feed or to supply the heat of reaction. Heat for vaporizing the oil and converting it is supplied by hot regenerated contact particles and no vaporizing furnace for the oil or reactants is necessary. The reactants introduced into line 10 are mixed in a mixing zone 13 (Figs. 1, 2 and 3) with hot regenerated catalyst or contact particles introduced into line 10 by means of line 12. As a result the liquid reactants are vaporized and raised to reaction temperature and the resulting mixture is passed through line 14 to the discharge end 16 of the pipe 14 which is flared or cone shaped to give a larger area for distributing the mixture in the reaction zone. The discharge end of the line 14 is provided with a distribution plate 18 which is provided with perforations for distributing the solid particles and the vaporized or gaseous reactants as they are discharged into the reaction zone 22 formed in larger vessel 23.

Where the pipes 10 and 12 are of a relatively large diameter the reactants are mixed with the hot catalyst particles by means of a plurality of pipes or smaller lines to more evenly distribute the reactants into the catalyst or contact particles as will be hereinafter described in greater detail.

The catalyst or contact particles and vaporized or gaseous reactants after being introduced into the reaction zone 22 are maintained therein in a dry fluidized condition having a level indicated at 24. The solid particles are maintained in a fluidized condition by selecting or maintaining the velocity of the gases or vapors at a desired figure. The level shown at 24 is included only for the purpose of illustration and this level may be varied either to control the extent of the reaction or to carry out different reactions.

The reactants remain in contact with the solid or catalyst particles for the desired time to effect the desired reaction. The catalyst or contact particles are maintained in a turbulent condition in the reaction zone and the reactants are contacted with the solid particles. A substantially uniform temperature is maintained throughout the fluidized bed of catalyst because of the fluidized condition of the solid particles.

The reaction products in vapor form leave the fluidized catalyst bed and pass upwardly through a separating means 26 which is shown in the drawing as a cyclone or multi-clone separating means. Preferably the separating means is arranged in the upper portion of the reaction zone or vessel 22. Other separating means 26 provides a means used. The separating means 26 provides a means for separating dry entrained solid particles from the dry vaporous reaction products. The vaporous reaction products pass through line 28 to a fractionating system (not shown) or a system for separating desired products. The separated solid particles are collected in the hopper 32 associated with the separating means and returned to the catalyst bed in the reaction zone through one of a plurality of return dip pipes.

As shown in the drawing, a longer return pipe 34 and a shorter return pipe 35 are provided. The longer return pipe 34 is provided with a valve 36 and the shorter return pipe 35 has a valve 42. As shown in the drawing, the longer return pipe 34 extends into the bed of catalyst below the level 24 and this return pipe is used where the catalyst bed is relatively shallow. Where the catalyst level 24 rises above the shorter return pipe 35, the shorter return pipe 35 is used to return the catalyst to the catalyst bed. The valve 36 is manually operated from outside the reactor to maintain the pipe 34 substantially full of contact particles at all times when the longer pipe 34 is being used during the operation of the process.

When longer pipe 34 is used, valve 42 in shorter pipe 35 is closed. When the shorter pipe 35 is used, valve 42 is manually operated from outside the reactor to maintain the pipe 35 full of contact particles during the operation of the process and valve 36 in longer pipe 34 is closed. The extent of conversion may be controlled or changed by varying the height of catalyst level 24 in the reaction zone 22. Similar return pipes of different length may be used for returning catalyst from the cyclone separating means to the regeneration zone later to be described.

The vaporous reaction products leaving the separating means 26 contain a small amount of entrained catalyst and are passed through line 28 and introduced into suitable equipment for separating desired products or fractions from the reaction products. Heavier constituents are condensed and entrained catalyst particles are collected in the condensate oil as a slurry. A portion or all of this slurry may be returned to the reaction zone 22 as recycle through line 11.

Below the reaction vessel 23 and the discharge end 16 of the inlet pipe 10 an enlarged chamber 46 is provided in the bottom portion of the vessel 23 for receiving the catalyst particles from reaction zone 22. As the spent catalyst leaves the bottom of the reaction zone 22, it falls into an annular stripping zone 47 formed by cylinders 48 and 49. Cylinder 48 is spaced from and supported by the inner wall of vessel 23. Inner cylinder 49 is supported from the edge of flared discharge end 16 and hangs down into chamber 46. The stripping zone 47 terminates above the bottom of vessel 23. However, the stripping zone may be constructed and supported in other ways. Stripping zone 47 is provided to maintain the velocity of the stripping gases passing through zone 47 above a minimum velocity to obtain improved stripping. The flared discharge end 16 and the stripping zone 47 are arranged to provide a compact arrangement and to provide a stripping zone of the desired size.

Circular headers 50 are provided which surround a portion of the cone shaped bottom of the reaction vessel or zone. A line 51 associated with manifold 52 is provided for feeding a purging or fluidizing gas such as steam, normally gaseous hydrocarbons or other inert gas to the circular headers. When using activated bentonite clays as conversion catalysts steam may be used as a purging gas, but when using a synthetic silica-alumina gel, the use of other gases may be preferred.

From the circular headers 50, one or more inlet lines 53 extend into chamber 46 below stripping zone 47 for introducing stripping gas into this zone. Preferably line 53 feeds stripping gas into a ring 53a arranged below stripping zone 47. Ring 53a has a plurality of equally spaced openings in its upper part for distributing stripping gas over the cross section of the stripping zone 47. More than one ring may be used if desired.

The stripping or purging gas passing upwardly through the relatively dense fluidized spent catalyst or contact particles substantially removes volatile constituents therefrom. Another inlet line or lines 53' lead to the bottom of chamber 46 for fluidizing the purged catalyst introduced thereinto from the striping zone. To prevent active catalyst from by-passing the reaction zone from the flared discharge end 16 to the stripping zone 47, a sleeve of about the same diameter as plate 18 may be placed on the flared discharge end 16 to extend above the flared discharge end 16 for a short distance.

Preferably the reaction zone adjacent the discharge end 16 of the inlet pipe 14 has an annular inwardly projecting portion 54 for reducing the area of the reaction zone immediately above the discharge end 16. In this way the velocity of the reactants above the discharge end 16 of the inlet pipe 14 is maintained sufficiently high to prevent settling of the catalyst particles. The stripping gas then passes upwardly through the bed of catalyst and out with the vaporous reaction products. Portion 54 is shown on the drawing as an extension of cylinder 48 of the stripping zone but separate sections may be used.

If desired, the hopper 32 and the return pipes 34 and 35 may be provided with fluidizing inlets for introducing fluidizing gas. In the drawing a fluidizing line 56 is shown for introducing gas into the lower portion of the return pipe 34. Lines 58 associated with circular headers 59 are shown for introducing fluidizing gas into the hopper 32. A fluidizing inlet 62 is shown for the shorter return pipe 35. More than one fluidizing inlet may be used.

The purged spent catalyst is withdrawn from the bottom of the chamber 46 by means of standpipe 64. The standpipe 64 is provided with slide valves 66 and 68. The bottom valve 68 is used to control the amount of catalyst being withdrawn from the reaction zone 22. Slide valve 66 is provided as a spare. In case it is desired to shut down the system, both valves are closed. The standpipe 64 may also be provided with one or more fluidizing inlets as shown at 69 to introduce fluidizing gas, if desired.

The spent catalyst from the standpipe 64 is introduced into line 72 where it is mixed with a suitable regenerating gas introduced through line 74. The regenerating gas may be any suitable oxygen-containing gas such as air or flue gas containing free oxygen. The regenerating gas may be at about atmospheric temperature or may be high temperature gas such as freshly produced combustion gases. The mixture of catalyst particles and regenerating gas forms a lighter or less dense mixture and the back pressure in the reaction zone 22 together with the head of fluidized catalyst in the standpipe 64 and in the vessel 23 provides the necessary pressure for moving the spent catalyst through line 76 into the bottom portion of the regeneration zone 78. The regeneration zone 78 is provided with a perforated distribution plate 82 below which the mixture of spent catalyst and regenerating gas is introduced. The distribution plate functions to distribute evenly the catalyst and regenerating gas over the area of the plate. The velocity of the gases passing through the regeneration zone 78 is so selected or maintained to fluidize the catalyst particles undergoing regeneration and so that the fluidized catalyst particles maintain a level indicated at 84. The level is shown in one position in the drawing but may be varied if desired.

At one side the regeneration zone is provided with a vertically arranged baffle 86 to provide a well 87 for receiving regenerated catalyst from the regeneration zone 78. With the level 84 arranged at a certain distance below the top of the regeneration zone there will be only a small amount of catalyst or contact particles entrained in the regeneration gases leaving the catalyst bed in the regeneration zone. In order to remove a large part of the entrained catalyst particles a separating means 88 is provided in the top portion of the regeneration zone 78. As shown in the drawing, the separating means is a cyclone separator or Multi-clone separator but other forms of separating means may be used. The regeneration gases pass overhead through line 92. The separated solid particles are collected in a hopper 94 associated with the separating means 88.

If desired, the hopper 94 may be provided with headers 96, manifold 98 and inlet lines 102 for introducing fluidizing gas into the hopper to maintain the solid particles in fluidized condition. The solid particles from the hopper 94 pass to a return pipe 106 provided with a manually operated damper or valve 108 near its lower end. The valve 108 is operated from the exterior of the unit to maintain the pipe 106 full of catalyst at all times during the operation of the unit. The return pipe 106 may be provided with a fluidizing line 109 for introducing fluidizing gas at one or more points to maintain the solid particles in fluidized condition.

From the well 87 the hot regenerated catalyst or contact particles in a dry dense fluidized condition are withdrawn and passed to a standpipe 112 provided with slide valves 114 and 116. The bottom valve 116 is used to control the amount of catalyst or contact particles being introduced into line 12 for admixture with the reactants introduced into line 10. Top valve 114 is used as a spare. Fluidizing lines 117 are provided for the standpipe 112 for introducing fluidizing gas at one or more points in the standpipe to maintain the particles in fluidized condition. Air may be used as a fluidizing gas in lines 117 and inlet lines 102 for hopper 94, especially when cracking with synthetic catalyst. Steam is preferred for natural catalyst operation so as to reduce the quantity of non-condensible gases entering the reactor along with the regenerated catalyst. The standpipe 112 is a long apparatus and fluidizing gas introduced into the lower half of the standpipe may be at a higher pressure than fluidizing gas introduced into the upper half of the standpipe.

Returning now to the regeneration gases leaving the regeneration zone 78 through line 92, the regeneration gases are passed through a waste heat boiler 118 which is used for recovering heat from the regeneration gases while at the same time reducing the temperature of the regeneration gases. The waste heat boiler 118 is provided with an inlet 122 and an outlet 124 for a cooling medium such as water for indirect heat exchange relationship with the regeneration gases to produce steam. The cooled regeneration gases are then passed through line 126 and introduced into the lower portion of a Cottrell precipitator 128 for removing the last traces of solid particles from the gases. Other separating means as a filter, screens or the like may be used. The gases freed of powdered material are passed overhead through line 132 and may be vented to the atmosphere.

The separated solid particles are collected in a hopper 134. If desired, headers 136 may be used having a manifold 138 and inlet lines 139 for introducing fluidizing gas into the hopper 134.

The solid particles recovered in the Cottrell precipitator are exceedingly fine and are difficult to fluidize. In order to make a fluidizable mixture, coarser regenerated particles from the well 87 in the regenerator 78 are withdrawn through line 144 and introduced into the hopper 134 associated with the Cottrell precipitator. A valve 145 is provided in the line 144 for controlling the amount of coarser particles introduced into the hopper 134.

The mixture of fine and coarser solid particles is then introduced into a standpipe 152 provided with slide valves 154 and 156 similar in operation and construction to those above described. If desired, fluidizing inlets 157 may be provided for introducing fluidizing gas into the standpipe 152 at one or more points.

The fine solid particles together with the admixed coarser particles after leaving the standpipe 152 are mixed with a gas such as air introduced through line 158 and the mixture blown through line 162 and returned directly above the well 87 in regeneration zone 78 at the point 164.

When feed stocks are used which do not deposit sufficient burnable deposits to raise the temperature of the regenerated powdered catalyst or contact material to the desired extent, heat is added to the regenerated catalyst in other ways. For example, oil may be added to the regeneration zone 78 and burned therein to increase the temperature of the solid particles undergoing regeneration therein. A part or all of the oil slurry separated with the condensate oil recovered from the reaction products as above pointed out may be injected into line 76 through line 190 or into regeneration zone 78 through line 192.

Instead of using the oil slurry or in addition thereto an auxiliary burner 194 may be used. Fuel, such as gas, is introduced into the burner 194 through line 196. As shown in the drawing a down flow burner is used but other forms of burners may be used. Air to support combustion is introduced into the top of the burner 194 through line 198. Preferably the fuel line 196 and air line 198 are so interconnected by controls that the fuel is automatically turned off if the air supply is turned off for any reason. The air is first compressed in compressor 202 to a pressure of about 10 to 15 lbs. per square inch and one part thereof passed to burner 194 through line 198, another part thereof passed through line 204 and line 206 to be used as quenching air introduced into the lower part of burner 194 to reduce the temperature of the combustion gases leaving the burner 194 through line 208 supplying line 74 to about 1250° F. The quench air also supplies the rest of the regenerating gas for regenerating the spent catalyst in the regeneration zone 78. A portion of the compressed air passing through line 204 is passed through line 212 to remove part of the moisture from the air as will be presently described.

The hot products of combustion and air passing through line 208 are introduced into line 72 through line 74. In this way heat is added to the regeneration zone and to the heat of regeneration and the contact particles are heated to a temperature of about 1050° F. to 1200° F. so that the contact particles will have a sufficiently high temperature to heat the reactants and also to supply the heat of reaction. In cases where the auxiliary burner 194 is not needed regenerating gas at ordinary temperature may be introduced through line 74 into line 72.

The portion of the air passing through line 212 is passed through a cooler 214 having an inlet 216 and an outlet 218 to remove heat of compression and to reduce the temperature of the compressed air to about 70° F. to 110° F. At this temperature water is condensed and collected in drip drum 222 into which the cooled compressed air is introduced. Water is removed from drum 222 through valved outlet 224 and the partially dried air leaves the top of the drum through line 226.

In certain cases it is desirable to have relatively dry air for use as a fluidizing means or as a means for transferring relatively cool powdered material as will be hereinafter described. The compressed air is not completely dried but has been cooled to a temperature lower than will be encountered in the process and therefore no condensation of water will result when the dried air is mixed with relatively cool powder.

When it is desired for any reason to shut down the unit, the fuel to the auxiliary burner 194 is turned off but not the air, and feed of reactants to the unit is turned off. The valves at the bottom of standpipes 112 and 152 are closed. The reaction zone 22 is purged with steam introduced from line 51 through line 53 adjacent stripping zone 47, line 53' entering the bottom portion of chamber 46 and line 227 which leads into the bottom portion of an upwardly directed tube 228 forming an extension of feed line 10. Then as much as possible of the catalyst from the reaction zone 22 is emptied into the regeneration zone 78 via standpipe 64 and lines 72 and 76. The vent line 28 from reaction zone 22 is shut off to the fractionating equipment in any suitable manner and the dust laden gas is passed to the Cottrell precipitator through valved line 229.

The steam lines 51 and 227 are then closed and air is passed into line 228 through line 232 and through line 228' leading to lines 53 and 53' from line 208. Valves 114 and 116 in standpipe 112 are then partly opened to permit recycling of catalyst at a low rate from the reaction zone 22 to the regeneration zone 78, etc. while the unit cools to about 300° F. to 500° F.

Drawoff line 236 connects with standpipe 112 above valve 114 and has a valve 238 and drawoff line 242 connects with standpipe 152 above valve 154 and has a valve 244. Valves 238 and 244 are opened and fluidized catalyst or contact particles flow into lines 236 and 242 respectively. Dry air from line 226 is passed through lines 246 and 248 into lines 236 and 242, respectively, for forming a relatively light suspension of the powdered material. The two lines 236 and 242 empty into line 252 (see Fig. 1A) and the powdered material is sent through a cooler 254 where it is in indirect heat exchange with a cooling medium introduced into cooler 254 at 256 and leaving the cooler at 258. If no cooling of the catalyst is necessary, cooler 254 is by-passed and the catalyst is passed through line 259. A part of the cooled catalyst may be removed from the system through line 260. Or catalyst may be removed from by-pass line 259 through line 261.

The powdered material at a temperature of about 150° F. to 600° F. passes through line 262 into the upper portion of a storage hopper 264 where separation of solid particles from carrying gas is effected. The top portion of hopper 264 has an outlet line 268 for dust laden gas which passes to a bag filter or the like 272. The bag filter is connected with exhauster 266 by line 274. Exhauster 266 has an outlet 276 to the atmosphere. In the bag filter powdered solid material is separated from gas and drops into the bottom portion of filter 272 from which it is removed by a star feeder 278 to a conveyor 282.

The conveyor 282 has a means diagrammatically shown at 284 for rotating it and is further provided with two screw portions 286 and 288. When the conveyor is rotated in one direction screw portion 286 operates to move separated powdered material from filter 272 to the top of storage hopper 264 through line 292 and when the conveyor is rotated in the opposite direction the screw portion 288 operates to move separated powdered material from filter 272 to the other storage hopper 294.

When storage hopper 294 is to be used the suspension in line 262 by-passes storage hopper 264 and passes through line 296 to hopper 294. Hopper 294 also has a line 298 connecting it with the bag filter 272. Line 299 connects line 298 with line 268 leading to bag filter. Lines 298 and 299 are open to the atmosphere at all times via line 300 so that it is impossible to have a sub-atmosphere pressure in the storage hoppers.

During removal of catalyst from the system the regenerator and Cottrell standpipes are the ones used as the removing means. Catalyst is moved from the reaction zone 22 to the regeneration zone 78 and is then removed from the regenerator well 87.

Storage hopper 264 is provided with aeration lines 302 for introducing fluidizing gas into the bottom portion of the hopper when it is desired to remove catalyst from the hopper and pass it to the unit. For forcing the fluidized mixture from either storage tank 264 or 294 fluid under superatmospheric pressure is supplied to the hopper selected. In starting up the unit, the catalyst is cold and if compressed atmospheric air were used, condensation of water would result in the catalyst and lumps would form or even plugging of the lines might occur. Therefore, it is desirable to use the partly dry air from line 226 as a fluidizing means in lines 302. Storage hopper 294 also has aerating lines 304. For aerating or fluidizing the powdered material in hoppers 264 and 294, only the bottom row of aerating lines 302 and 304, respectively, may be used.

Each storage hopper has shut off slide valves 306 in withdrawal lines 308 for permitting withdrawal of catalyst or powdered material from the storage hoppers. When all powdered material is removed from the unit the flow of all gas is stopped to the hoppers.

The feeding of reactants to the unit will now be described. When the reactants are liquid such as crude petroleum oil, gas oil or the like, it is necessary to obtain proper mixing of the hot regenerated catalyst and the liquid reactants. See Figs. 2, 3 and 4. Catalyst is introduced into line 10 from line 12 and oil is introduced through a plurality of nozzles 312 arranged in a circle within line or pipe 10. The nozzles introduce the oil at high velocity to obtain intimate mixing with the catalyst. The nozzles are arranged downstream from the catalyst inlet and therefore to prevent build-up of catalyst at the bottom 314 of pipe 10 and in extension 228, a valved inlet 316 is provided for introducing a gas into the bottom portion of extension 228. With ordinary clay catalysts, steam or other inert gas may be used, but where synthetic gels are used, preferably normally gaseous hydrocarbons or gaseous hydrocarbons from the absorption plant or other inert gases may be used as a gas for introduction through line 316. Line 228 has a safety valve connection 318.

In Fig. 3 it will be seen that oil is pumped through line 11 by pump 326 and then into branch lines forming continuations of line 11 which connect with the nozzles 312. As shown in the drawing there are nine nozzles but the number may be varied as desired. The lines 328 leading to the nozzles are bent at 332 so that the nozzles 312 are spaced from and parallel to the wall of pipe 10 and point in a direction away from the bottom 314 of pipe 10, that is, they point downstream.

Another set of nozzles 336 is provided having branch lines 11' for feeding oil slurry or cycle oil into the catalyst or contact particles passing through pipe 10. Instead of using two sets of nozzles, only one set may be used for feeding the oil and slurry to the pipe 10 but two sets of nozzles are preferred so as to have a minimum number of nozzles which are exposed to the erosive action of the slurry.

While the invention may be used for carrying out catalytic reaction generally, specific examples will now be given to illustrate how the invention is used in the catalystic conversion of hydrocarbons. For the catalytic cracking of relatively heavy hydrocarbons such as reduced crude, gas oils or the like and in order to obtain about 45% conversion to gasoline a catalyst is used such as acid treated bentonite clays or synthetic gels containing silica and alumina or silica and magnesia. For preparing gasoline having a relatively high octane number a synthetic gel catalyst is used. The catalyst or contact material is preferably in powdered form of a size mainly between 200 and 400 standard mesh or finer and containing about 5% to 25% of particles having a size between 0 and 20 microns.

In the catalytic cracking of a reduced crude oil the cracking temperature in the reaction zone is about 980° F. and the regeneration temperature is about 1100° F. With the reduced crude oil preheated to a temperature of 160° F. and in order to supply the heat of vaporization and of cracking a mixture of inert solid particles and catalyst particles is used. The ratio of solid material to the crude oil by weight is about 25 to 1. The catalyst is included in this solid to oil ratio and the amount of catalyst in the mixture is about in the proportion of 9 to 1 part of oil by weight. The velocity of the vapors and gases in the reaction zone and the regeneration zone is about 1.5 feet per second. With this velocity the fluidized mixture in the reaction zone 22 has a density of about 10 to 20 pounds per cubic foot and the density of the suspension above the catalyst bed 24 is much smaller, decreasing to about 0.002 to 0.01 pound per cubic foot at the cyclone inlet. The regeneration zone is maintained under a pressure of about 1 pound per square inch gauge and the reaction zone is maintained under a pressure of about 9 pounds per square inch gauge. The reason for maintaining the reaction zone under a slight pressure is to provide sufficient pressure to overcome pressure drop through the outlet lines and fractionating or other equipment used to recover gasoline and other fractions.

In another example a relatively light gas oil is used for producing aviation gasoline. A light East Texas gas oil having a 37° A. P. I. gravity, a mid-boiling point of about 540° F. and a final boiling point of about 700° F. is preheated to about 400° F. after having passed through heat exchangers not shown in the drawing. The preheated gas oil is mixed with the hot regenerated catalyst which is at a sufficiently high temperature to heat and vaporize the gas oil and to maintain it at the conversion temperature desired. In this case no solid inert material is added to the catalyst and only catalyst particles are used. In some cases, however, inert solid particles may be added.

The catalyst is in finely divided form and has particles of a size of 200 to 400 standard mesh or finer. The catalyst may be any suitable cracking catalyst but for the production of aviation gasoline a synthetic gel catalyst containing silica and alumina or silica and magnesia is preferred.

In order to supply the necessary heat of vaporization and of cracking and to obtain about 30% conversion of the gas oil to aviation gasoline about 7.5 parts of catalyst comprising the synthetic gel, silica-alumina, to one part of oil by weight are used. The temperature during cracking is about 700° F. to about 850° F. The fluidized mass of catalyst particles in the reaction zone 22 has a density of about 12 to 16 pounds per cubic foot and the velocity of the vaporous products leaving the reaction zone 22 is about 1 to 2 feet per second.

The velocity of the regenerating gas in regeneration zone 78 is about 1 to 1.5 feet per second and with this velocity the catalyst particles in the regeneration zone are maintained in the fluidized condition and have a density of about 12 to 16 pounds per cubic foot. Due to the turbulent condition of the catalyst particles in the regeneration zone the temperature during regeneration is maintained substantially uniform throughout the fluidized mass and is about 1050° F. The hot regenerated catalyst at about 1050° F. flows down the standpipe 112 and is directly mixed with the light gas oil to supply heat of vaporization and heat of reaction or conversion.

While certain velocities have been given for the vapors leaving the reaction zone 22 and the regeneration gas leaving the regeneration zone 78, it is to be understood that other velocities may be used between about 0.5 and 1.5 feet per second. The regeneration temperatures may be varied but when acid treated bentonite clays are used the temperature during regeneration is preferably maintained below about 1200° F. Higher regeneration temperatures than 1200° F. may be used with synthetic gel catalysts. When using higher regeneration temperatures, less catalyst or solid particles will be necessary for vaporizing the gas oil or other feed and maintaining it at the reaction temperature.

With the nozzles 312 arranged as shown in Fig. 2, the nozzles are surrounded by a stream of solid particles in pipe 14 to prevent splashing of the liquid oil against the wall of pipe 14 where coke deposits might form and so as to prevent the accumulation of liquid oil in any part of the reactor inlet line 14.

In the examples given above the conditions may be varied without departing from the spirit of the invention.

While the invention has been particularly described in the examples in connection with catalytic cracking of hydrocarbon oils, it is to be understood that it may be used in other catalytic conversions of hydrocarbons such as reforming, hydroforming, alkylation, polymerization, dehydrogenation, etc. and may also be used in other catalytic reactions, such as, oxidation, reduction, chlorination, shale distillation, coal carbonization, etc.

While one form of apparatus has been shown in the drawing and specific examples have been given, it is to be understood that these are by way of illustration only and various changes and modifications may be made without departing from the spirit of the invention.

This application is filed as a division of our application Serial No. 470,534 filed on December 30, 1942, now Patent No. 2,490,798, granted December 13, 1949.

What is claimed is:

In a high temperature process using a large amount of catalyst particles for converting a hydrocarbon feed in the presence of recycled fluidized catalyst in a reaction zone and regenerating the resulting spent catalyst as a fluidized mixture in a regeneration zone and wherein it is desired to shut down the process and remove substantially all the catalyst from the reaction and regeneration zones, the improvement which comprises turning off the hydrocarbon feed, purging the reaction zone with steam, restricting the flow of catalyst into the reaction zone, transferring as much as possible of the catalyst from the reaction zone to the regeneration zone, introducing air into the reaction zone and recycling catalyst at a low rate between the reaction zone and the regeneration zone while the catalyst is cooled by the air to about 300° F. to 500° F., downwardly removing the catalyst from the regeneration zone as a dense fluidized column, adding gas to the removed catalyst to form a lighter suspension, passing said suspension of catalyst to a settling and storage zone which is vented to the atmosphere, exhausting dust-laden gas from an upper portion of said storage zone, recovering solid material from said dust-laden gas and returning the recovered solids to the storage zone.

EDWIN J. GOHR.
HOMER Z. MARTIN.
CHARLES E. JAHNIG.
CHARLES W. TYSON.
JOHN M. GRAHAM.

References Cited in the file of this patent

UNITED STATES PATENTS

| Number | Name | Date |
|---|---|---|
| 2,319,590 | Eastman | May 18, 1943 |
| 2,325,516 | Holt et al. | July 27, 1943 |
| 2,337,684 | Scheineman | Dec. 28, 1943 |
| 2,387,309 | Sweeney | Oct. 23, 1945 |
| 2,391,367 | Hodgeson | Dec. 18, 1945 |
| 2,393,554 | Ogorzally | Jan. 22, 1946 |
| 2,396,109 | Martin | Mar. 5, 1946 |
| 2,410,284 | Gunness et al. | Oct. 29, 1946 |
| 2,440,623 | Voorhees | Apr. 27, 1948 |
| 2,448,553 | Schutte et al. | Sept. 7, 1948 |
| 2,451,804 | Campbell et al. | Oct. 19, 1948 |
| 2,488,031 | Gunness | Nov. 15, 1949 |
| 2,490,798 | Gohr et al. | Dec. 13, 1949 |
| 2,515,374 | Keith et al. | July 18, 1950 |